United States Patent
Kawasaki et al.

[11] Patent Number: 5,255,046
[45] Date of Patent: Oct. 19, 1993

[54] CAMERA SYSTEM

[75] Inventors: Masahiro Kawasaki; Hiroyuki Takahasi; Shigeru Iwamoto, all of Tokyo, Japan

[73] Assignee: Asahi Kogaku Kogyo Kabushiki Kaisha, Tokyo, Japan

[21] Appl. No.: 748,782

[22] Filed: Aug. 22, 1991

[30] Foreign Application Priority Data

Aug. 22, 1990 [JP] Japan .................... 2-220888

[51] Int. Cl.$^5$ .................... G03B 7/00; G03B 7/26
[52] U.S. Cl. .................... 354/412; 354/484
[58] Field of Search ............ 354/484, 412, 286, 410

[56] References Cited

U.S. PATENT DOCUMENTS

| | | | |
|---|---|---|---|
| 4,477,164 | 10/1984 | Nakai et al. | 354/286 |
| 4,509,842 | 4/1985 | Taniguchi et al. | 354/286 X |
| 4,560,267 | 12/1985 | Nakai et al. | 354/412 |
| 4,602,871 | 7/1986 | Taniguchi et al. | 354/403 |
| 4,673,275 | 6/1987 | Nakai et al. | 354/412 |
| 4,841,322 | 6/1989 | Kawasaki et al. | 354/286 |
| 4,945,376 | 7/1990 | Kawasaki et al. | 354/400 |
| 4,963,907 | 10/1990 | Inoue et al. | 354/465 |
| 4,965,619 | 10/1990 | Shikaumi et al. | 354/410 |
| 5,066,969 | 11/1991 | Kawasaki | 354/402 |

Primary Examiner—Michael L. Gellner
Assistant Examiner—Jae N. Noh
Attorney, Agent, or Firm—Sandler, Greenblum & Bernstein

[57] ABSTRACT

A camera system includes a camera body and a photographing lens detachably attached to the camera body. The camera body includes a first controller for controlling the operation of the camera system. The photographing lens includes a second controller for controlling the operation thereof. The second controller of the photographing lens is brought into a sleep state when the first controller of the camera body outputs a first predetermined signal.

43 Claims, 12 Drawing Sheets

CAMERA SYSTEM

BACKGROUND OF THE INVENTION

1. Field of the Invention

The present invention relates to a camera system for transmitting and receiving lens data between a camera body and a photographing lens.

2. Description of Related Art

A photographing lens, also referred to as an (interchangeable lens) in a recent single lens reflex camera having an automatic focusing device is usually provided with memory means (e.g., a ROM), in which lens data peculiar to the photographing lens is stored.

The camera body is provided with a microcomputer which communicates with the lens to read the lens data stored in the ROM in order to calculate exposure factors (i.e.; diaphragm value and shutter speed, etc.), based on the lens data and luminance of the object to be taken in accordance with a predetermined algorithm, to thereby carry out the exposure control and the focus control.

The lens data includes, for example, an Apex value Avmin (open F-number) at an open aperture, an Apex value Avmax (maximum F-number) at a minimum aperture, a focal length f, or diaphragm data for the highest quality picture (best quality diaphragm data). The best quality diaphragm data includes, for example, the diaphragm value at which the highest resolution is given, the diaphragm value at which the highest modulation transfer function (MTF) is given, the diaphragm value at which there is no vignetting, or the diaphragm value at which the aperture defined by the diaphragm blades is substantially circular.

It is also known to provide a control means in the photographing lens to perform part of the control, as well as data calculation, which have typically been carried out by the camera body in conventional cameras. For instance, a microcomputer (e.g., CPU) is provided in the photographing lens to carry out the calculation of optimum diaphragm values or focal lengths, etc., the focus control, or the zooming, etc., in association with the microcomputer of the camera body. The calculated data and the control commands are transmitted to and received from both the microcomputer of the photographing lens and the microcomputer of the camera body through an intermittent communication between the microcomputers.

The microcomputer of the photographing lens is usually supplied with electrical power by a power source in the camera body. The microcomputer of the photographing lens automatically performs the operations mentioned above, such as calculation and communication whenever the power source of the camera body is turned ON, regardless of the photographing operation, resulting an increased power consumption. Furthermore, if the power to be supplied to the microcomputer of the photographing lens is removed, all the operations must again be carried out from the beginning, upon restarting. This results in an increase of communication time and a delay in operation.

SUMMARY OF THE INVENTION

The primary object of the present invention is to provide a camera system including a photographing lens having a control means in which an unnecessary operation, such as a control or calculation, of the photographing lens control means is stopped when there is no photographing operation to be carried out so as to decrease the power consumption of the camera system.

To achieve the object mentioned above, according to the present invention, there is provided a camera system that includes a camera body, and a photographing lens that is attached to the camera body. The camera body comprises a first control means for controlling the operation of the camera system, and the photographing lens comprises a second control means for controlling it's own operation. The second control means of the photographing lens is placed into a sleep state when the first control means of the camera body outputs a first predetermined signal.

With this arrangement, since the control means of the photographing lens is placed into the sleep state when the camera body outputs the first predetermined signal from the camera body, when there is no photographing operation to be carried out, the electrical power consumption can be reduced.

The lens data output from the photographing lens includes initial value data that is peculiar to the photographing lens and variable data which varies in accordance with the focal length or the object distance or the like.

Therefore, according to the present invention, the initial value data is only transmitted through the first communication, and the variable data is only transmitted through subsequent communications, so that the communication time can be reduced, resulting in a decreased power consumption.

Furthermore, since the control means of the photographing lens is in the sleep state in the absence of communication, less power consumption can be expected.

The present invention can be applied to a photographing lens itself. In a preferred embodiment of the invention, the photographing lens is placed into the sleep state when it receives the first predetermined signal outputted from the camera body.

The "sleep state" referred to means that the microcomputer does not operate, that is, the clock outputting means does not operate. In the sleep state, when the second predetermined signal is outputted from the control means of the camera body, or when any operation is carried out in the photographing lens, the control means of the photographing lens operates to actuate the clock outputting means (clock generating means) to thereby perform the necessary operations in accordance with a predetermined program.

The present disclosure relates to subject matter contained in Japanese patent application No. HEI 2-220888 (filed on Aug. 22, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
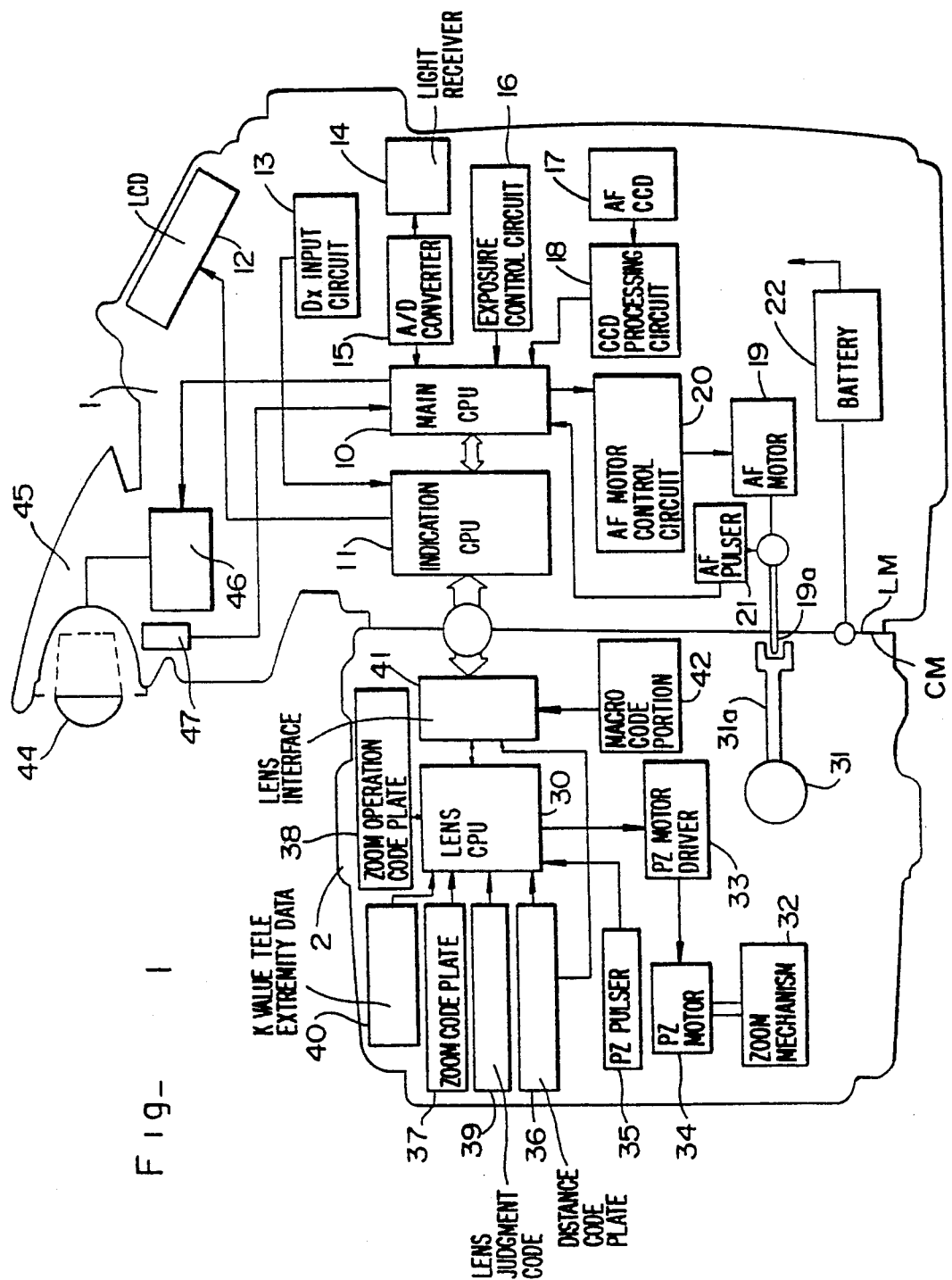
FIG. 1 is a block diagram of a camera system according to the present invention.

FIG. 1 shows a camera system according to an aspect of the present invention and applied to a single lens reflex camera having a camera body 1 and a zoom lens 2 attached thereto.

The camera body 1 has a main CPU 10 and an indication CPU 11 as a control means. The main CPU 10 generally controls the whole camera system and performs arithmetic operations on various data necessary for taking a picture. The indication CPU 11 has a data inputting function through switching members, an interface function for transmitting and receiving data (signals) to and from the zoom lens 2 (photographing lens), and a control function for controlling the indication of the photographing data.

The indication CPU 11 is connected to an LCD panel 12 which indicates the photographing data and a DX code input circuit 13 which reads at least ISO sensitivity data of a film from DX codes provided on a surface of a patrone of the film. A light receiver 14 which receives light incident thereon through the zoom lens 2, to output analog signals corresponding to the amount of light received, is connected to the main CPU 10 through an A/D converter 15.

The main CPU 10 is also connected to an exposure control circuit 16 which drives and controls a shutter mechanism (not shown) and a diaphragm mechanism (not shown), etc., in accordance with the input photographing data. The main CPU 10 is further connected to a CCD processing circuit 18 which detects the focus state of the zoom lens 2 in response to focus data of the object to be taken, output from an automatic focusing CCD object distance measuring sensor 17, an AF motor control circuit 20 which drives an AF motor 19 which controls the focus of the zoom lens 2, and an AF pulser 21 which detects the amount of rotation (angular displacement or number of revolution) of the AF motor 19 to generate pulses corresponding to the angular displacement. The object distance measuring sensor 17 receives light of the object through the zoom lens 2 to output a predetermined focus data signal (defocus signal).

The AF motor 19 drives the zoom lens 2 through a coupler 19a, which is provided on a body mount BM of the camera body and projects therefrom, and drives a coupler 31a provided on a lens mount LM of the zoom lens 2 when the connection between the couplers 19a and 31a is established.

A battery 22 powers not only the electronic components and electronic circuits in the camera body 1, but also the motor and electronic circuits in the zoom lens 2.

The zoom lens 2 is provided with a lens CPU so that functions as a lens controlling means, a focusing mechanism 31 which rotates a focus adjusting cam ring (not shown) to relatively move the focusing lens groups in the optical axis direction to thereby effect the focusing, and a zooming mechanism 32 which rotates a zoom ring (not shown) to relatively move at least two groups of variable power lenses in the optical axis direction to effect the zooming.

The focusing mechanism 31 is connected to a coupler 31a, which is electrically connected to the coupler 19a when the zoom lens 2 is attached to the camera body 1, to transmit the rotational drive of the AF motor 19 to the focusing mechanism 31. The focusing mechanism 31 rotates the focus adjusting cam ring with the help of the rotational drive force.

The couplers 19a and 31a can be disconnected from one another by a disengaging means (not shown) so that a photographer can manually rotate a focus adjusting operation ring to adjust the focus in the manual focusing mode.

The zooming mechanism 32 is driven by a PZ (power zoom) motor 34 that is controlled by a PZ motor driving portion 33. The PZ motor driving portion 33 is controlled by the lens CPU 30 or a zoom switch SWPZ2 (FIG. 3) in the auto power zoom mode. The PZ motor driving portion 33 is controlled by the lens CPU 30 which receives the output of a zoom operation code member (plate) 38 which is manually controlled by a photographer in the manual power zoom mode. The auto power zoom mode and the manual power zoom mode are selected by the lens CPU 30 in response to the operation of a zoom switch SWPZ1.

To the lens CPU 30 are connected a PZ pulser 35 which detects the displacement (number of revolutions) of the PZ motor 34 and generates a predetermined number of pulses corresponding thereto, a distance code plate (member) 36 which reads position data (object distance data) of the focus adjusting cam ring (focusing lens groups) driven by the focusing mechanism 31, a zoom code member (plate) 37 which reads the position data (focal length data) of the zooming cam ring (variable power lens groups) driven by the zooming mechanism 32, and a zoom operation code member (plate) 38 which inputs power zooming direction and speed data by operation of the zoom operation switches SWPZ1 and SWPZ2.

Note, that if the zoom lens is a single focus macro lens, since the displacement of the focusing lens group in the optical axis direction is increased, the zoom code member 37 which can provide more information can be used as an object distance data inputting means, in place of the distance code member 36.

To the lens CPU 30 are also connected a lens judgement code member 39 which determines the kind of photographing lens (zoom lens, single focus lens, or single focus macro lens, etc.), and a K value input member 40 which inputs data of the K value at the telephoto extremity. In the illustrated embodiment, "K value" means the number of pulses of the AF pulser 21 necessary to move an image plane formed by the photographing lens 2 through a unit displacement, but is not limited thereto.

Each of the distance code members 36 and the other code members are usually comprised of a code plate that is secured to a peripheral surface of the cam ring or the like, which is rotated during zooming or focusing etc., and brushes secured to the stationary lens barrel which have a plurality of electrical contacts independently brought into slide contact with the codes of the associated code plate. The positions of the cam rings are detected as bit information by the combination of codes ("H" and "L") with which the electrical contacts of the brushes come into contact.

A lens interface 41 is connected to a data input terminal of the lens CPU 30. The data communication between the lens CPU 30 and the indication CPU 11 is effected through the lens interface 41 to which a macro code member 42 is connected to input macro data thereto in the macro mode.

Circuit of Camera Body

Figure 2:
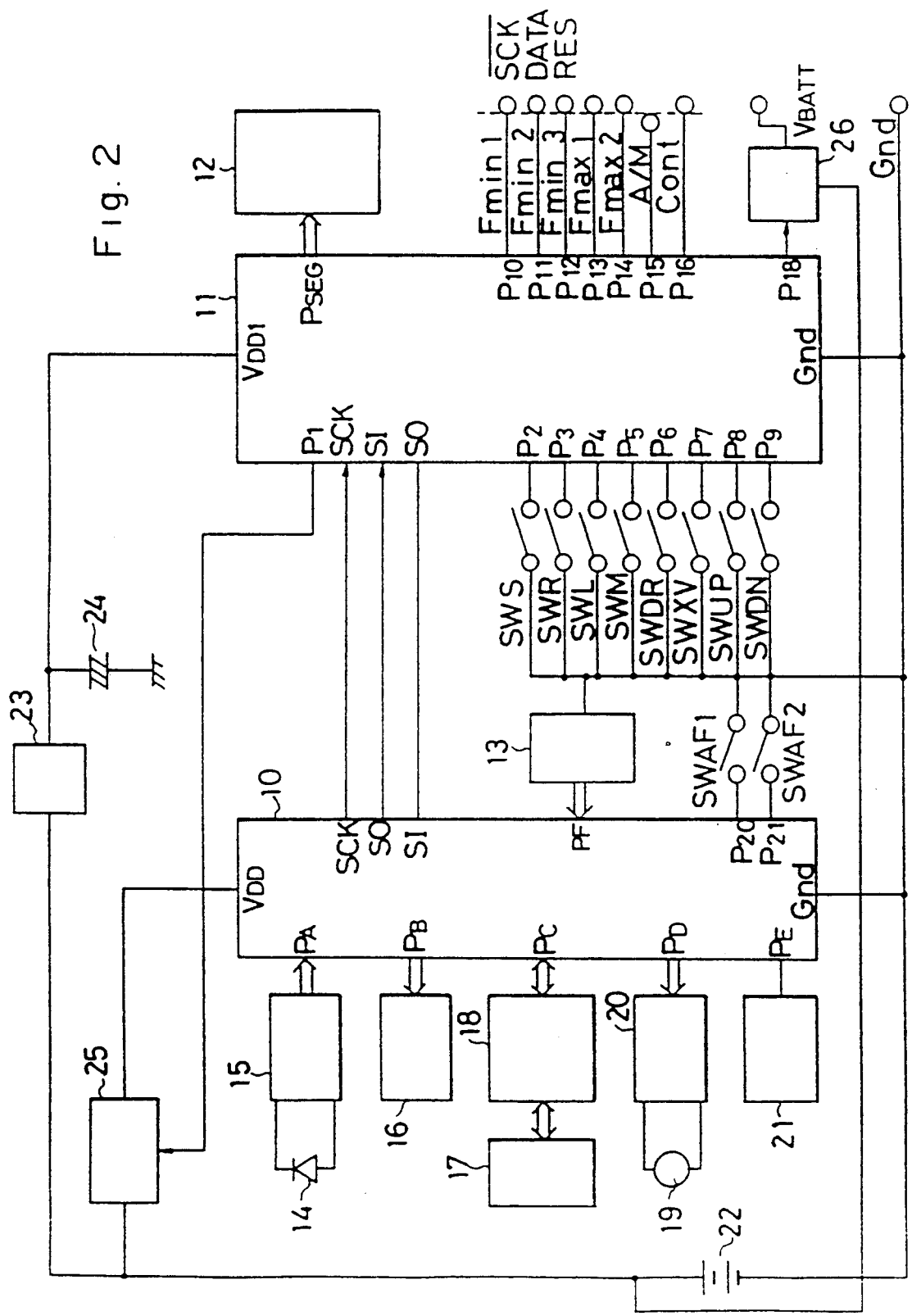
FIG. 2 is a block diagram of a main circuit arrangement of a camera body shown in FIG. 1.

The circuit arrangement of the camera body 1 will be described below in detail with reference to FIG. 2.

The voltage of battery 22 which is controlled by a regulator 23 and which is backed up by a super capacitor 24 is supplied to terminal VDD1 of the indication CPU 11. The indication CPU 11 is always activated by a constant voltage that is inputted terminal VDD1.

Terminals P1 and P2 of the indication CPU 11 are connected to a DC/DC converter 25 which turns the power source of the main CPU 10 ON and OFF, and a photometer switch SWS which is turned ON when a shutter button (not shown) is depressed halfway, respectively. Furthermore, terminals P3 and P4 of the indication CPU 11 are connected to a release switch SWR which is turned ON when the shutter button is fully depressed, and a lock switch SWL which is turned ON when the camera is brought into a position suitable for photographing, respectively.

The DC/DC converter 25 is actuated when the lock switch SWL is turned ON and when the photometer switch SWS or the release switch SWR is turned ON, and in accordance with a command from the indication CPU 11 upon inputting the lens data from the photographing lens 2, to supply terminal VDD1 of the main CPU 10 with a reference constant voltage to thereby actuate the main CPU 10.

Terminals P5, P6, P7, P8 and P9 of the indication CPU 11 are connected to a mode switch SWM, a drive switch SWDR, an exposure correction switch SWXV, an up-switch SWUP and a down-switch SWDN, respectively The indication CPU 11 operates in accordance with the operative and inoperative states of switches SWM, SWDR, SWXV, SWUP, and SWDN. For instance, the exposure modes, which includes a programmed exposure mode, an automatic exposure mode, and a manual exposure mode are selected in accordance with the operation of the mode switch SWM. Similarly, drive modes, which includes a single shot mode and a continuous shot mode are selected in accordance with the operation of the drive switch SWDR. The selection modes can be varied in accordance with the operation of up-switch SWUP and down-switch SWDN at the position in which the exposure modes or the drive modes can be selected.

The indication CPU 11 makes it possible to change the exposure value when exposure switch SWXV is turned ON. Namely, the exposure value can be increased and decreased in accordance with the operation of the up-switch SWUP and the down-switch SWDN, respectively.

The indication CPU 11 has a group of indication control terminals PSEG that are connected to an indicating LCD 12 through a bus line. The indicating LCD 12 indicates necessary photographing data in accordance with command of the indication CPU 11 when the lock switch SWL is turned ON.

Seven terminals P10 through P16 of the indication CPU 11 are connected to electrical contacts Fmin1, Fmin2, Fmin3, Fmax1, Fmax2, A/M, and Cont provided on the body mount BM of the camera body, respectively. Terminal P18 of the indication CPU 11 is connected to a switch circuit 26.

The electrical contacts Fmin1, Fmin2 and Fmin3 also function as communication terminals for data communication between the photographing lens 2 and the indication CPU 11. The electrical contacts Fmin1, Fmin2 and Fmin3 constitute a serial clock signal inputting and outputting terminal $\overline{SCK}$, a data transmitting and receiving terminal DATA, and a reset signal outputting terminal RES, respectively. Terminals P10, P11 and P12 of the indication CPU 11 are always pulled up within the indication CPU 11.

The output of the switch circuit 26 is connected to terminal VBATT and functions as a switch for establishing and breaking an electrical connection between the battery 22 and terminal VBATT in accordance with the level of the terminal P18. Terminal Gnd of the indication CPU 11 is connected to ground terminal Gnd of the battery 22.

The indication CPU 11 and the main CPU 10 communicate with each other through serial terminals SCK, serial-in terminals SI and serial-out terminals SO. In the data communication, data is transferred, for example using command codes.

Contact groups PA, PB, PC, PD, PE and PF of the main CPU 10 are connected to an A/D converter circuit 15, the exposure control circuit 16, the CCD processing circuit 18, the AF motor control circuit 20, the AF pulser 21, and the DX code input circuit 13, respectively.

Terminal P20 of the main CPU 10 is connected to a first AF switch SWAF1 which selects an auto focus mode in which focusing is automatically effected by the AF motor 19 and a manual focus mode in which the focusing is manually effected by a photographer. Terminal P21 of the main CPU 10 is connected to a second AF switch SWAF2 which switches the mode of the shutter release between a focus priority mode and a release priority mode.

The first and second AF switches SWAF1 and SWAF2 are mechanically associated with each other so that, for example, when the manual focus mode is selected by the first AF switch SWAF1, the second AF switch SWAF2 is switched to the release priority mode. Namely, when one of the AF switches SWAF1 and SWAF2 is turned ON, the other is turned OFF.

Crcuit of Zoom Lens

The circuit arrangement of the electrical system provided in the zoom lens 2 will be explained below, with reference to FIG. 3.

Lens mount LM of the zoom lens 2 is provided with electrical contacts VBATT, CONT, RES (Fmin3), $\overline{SCK}$ (Fmin1), DATA (Fmin2), GND, Fmax1, Fmax2 and A/M, which corresponds to associated electrical contacts provided on body mount BM when the zoom lens 2 is attached to the camera body 1. The electrical contacts of the lens mount are electrically connected to the corresponding electrical contacts of the body mount both of which are designated with the same reference numerals.

Contact VBATT on the lens side is connected to PZ driver 33 so that the power of the battery 22 is directly supplied to the PZ motor 34 through contact VBATT by the switching operation of the PZ driver 33.

Contacts Fmax1 and Fmax2 of the lens side function also as a steady information transmitting means for transmitting a minimum diaphragm F-number (maximum value) of two bits to the camera body, similar to those provided on a conventional AE lens. Namely, the contacts Fmax1 and Fmax2 on the lens side are grounded through switches SWmax1 and SWmax2 so that maximum F-number data is formed in accordance with a combination of the levels of the switches SWmax1 and SWmax2 depending on the combinations of ON/OFF states thereof.

Contacts A/M on the lens side functions to sending the auto/manual information of the diaphragm to the camera body 1 and is grounded through a selection switch SWA/M. The selection switch SWA/M is associated with the rotation of a diaphragm ring (not shown) of the photographing lens 2 so that when the diaphragm ring is in the auto position and the manual position, the selection switch is turned ON and OFF, respectively.

Contacts Fmin1, Fmin2, and Fmin3 on the lens side function not only as a steady information transmitting means for transmitting the open F-number information of three bits to the camera body 1, similar to those provided on a conventional (old) AE lens, but also as data communication contacts between the camera body and the zoom lens.

To provide both the steady information transmitting function and the data communication function on contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to lens contacts Fmin1, Fmin2 and Fmin3, and at the bases thereof to contact CONT through fuse portions H1, H2 and H3 so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes the voltage of the contact CONT to drop to ground in order to obtain the open F-number data from the lens contacts Fmin1, Fmin2 and Fmin3. As a result, a transistor Tr to which the fuse portion is connected is turned ON, so that the emitter of the transistor which has been turned ON becomes a high level "H", and the emitter of the transistor which has not been turned ON becomes a ground level "L". Namely, the transistors Tr are selectively turned ON or OFF in accordance with the connection of the fuse portions H1, H2 and H3 to change the level of the emitters thereof. Consequently, the three-bit open F-number data is output to the lens contacts Fmin1, Fmin2 and Fmin3.

Terminals CONT, RES, $\overline{SCK}$, DATA and GND of the lens interface 41 are connected to the terminals CONT, Fmin3, Fmin1, Fmin2 and GND on the lens side, respectively.

Lens contact CONT is connected to the bases of the transistors Tr and to terminal CONT of the lens interface 41, as mentioned above. The switching of the power supply from the terminal CONT of the lens interface is effected through the terminal RES (lens terminal Fmin3). After the data on the open F-number is read by the indication CPU 11, and when the terminals CONT and RES become levels "H" and "L", respectively, power is supplied to the lens CPU 30.

Terminal VDDB of the lens interface 41 is connected to terminal VDD of the lens CPU 30 through a capacitor C2, so that the constant voltage supplied from the terminal CONT of the camera body 1 is supplied to the lens CPU 30.

Terminals DIS1, DIS2 and DIS3 of the lens interface 41 are connected to the distance code plate 36 which constitutes an initial value data forming means so that the distance data signals of the object distance corresponding to the position of the focusing cam ring driven by the focusing mechanism 31 are sent as three bit signals to the terminals DIS1, DIS2 and DIS3.

Terminal MACRO of the lens interface 41 is connected to the macro code portion 42 which functions as a macro switch and is turned ON when the zoom operation ring is actuated to switch the photographing lens 2 to the macro mode. It is also possible to form the macro code portion 42 with a part of the codes of the zoom code member 37 when the mode is switched to the macro mode by the zoom operation ring.

The input and output terminals of the lens interface 41 are connected to the corresponding input and output terminals of the lens CPU 30. Reset terminal $\overline{RESB}$, clock terminal CLK, serial-in terminal SIS, serial-out terminal SOS, terminal $\overline{CE}$, terminal $\overline{SOE}$, terminal $\phi IN$, and terminal $\overline{KAFEND}$, of the lens interface 41 are connected to reset terminal $\overline{RESET}$, serial clock terminal $\overline{SCK}$, serial-out terminal SO, serial-in terminal SI, terminal P43, terminal P40, terminal PCL and terminal POO, of the lens CPU 30, respectively. Terminal CRES of the lens interface 41 is grounded through a delay capacitor C1.

The lens CPU 30 controls the rotation of the PZ motor 34 through the PZ driver 33 which is connected to the control terminal of the lens CPU 30. Lens CPU 30 is also connected to the PZ pulser 35 and the lens judgement code member 39.

Terminals P30, P31, P32 and P33 and terminals P62 and P63, of the lens CPU 30 are connected to the codes of the zoom code member 37. The lens CPU 30 performs arithmetic operations based upon the combination of input levels of these terminals P30, P31, P32, P33, P62, and P63 to obtain focal length data for a zoom lens and object distance data for a single focus macro lens.

Terminals P21 through P29 of the lens CPU 30 are connected to switches such as the auto focus switch SWAF3, the power zoom switches SWPZ1 and SWPZ2, etc. Terminals P24 through P29 are also connected to the zoom operation code plate 38.

The zoom lens 2 is provided with a clock pulse generating circuit 43 as a clock outputting means. The lens CPU 30 operates synchronously with the clock pulses generated by the clock pulse generating circuit 43.

Figure 4:
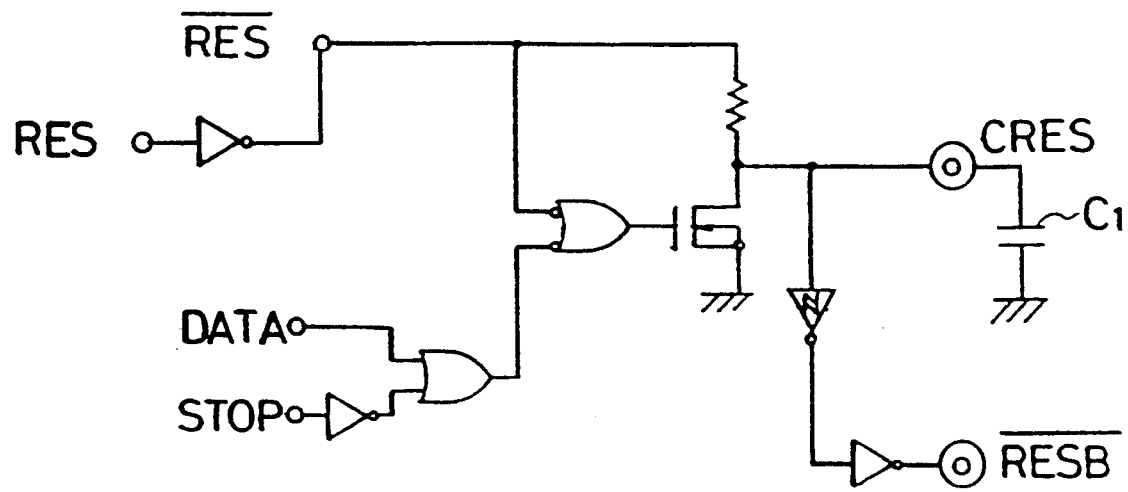
FIG. 4 is a block diagram showing a reset circuit of a photographing lens.
Figure 5:
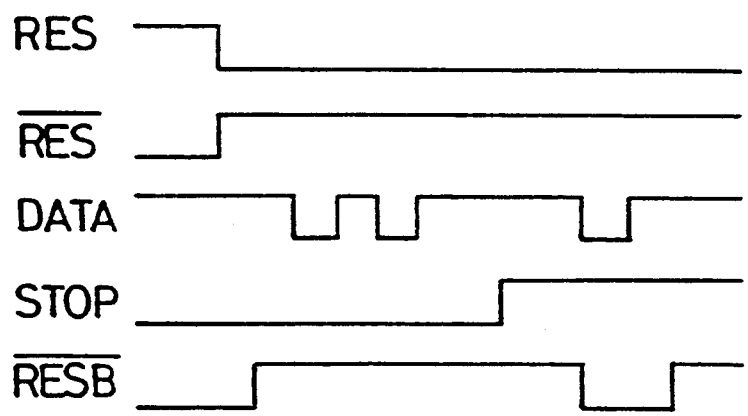
FIG. 5 is a time chart of a reset circuit shown in FIG. 4.

FIGS. 4 and 5 show a reset circuit of the lens interface 41 and a time chart of the reset circuit, respectively.

Upon commencement of an old communication, terminal RES is set at "H" by the indication CPU 11 to reset the lens interface 41, and terminal $\overline{RESB}$ drops to "L", so that the lens CPU 30 is reset.

Upon completion of the old communication, terminal STOP becomes a level "H". Terminal STOP is set at "H" by a stop circuit (not shown) in the lens interface 41 when the old communication is completed.

Upon completion of the old communication, the terminal RES is held at "L" and the terminals STOP and $\overline{RESB}$ are held at "H", respectively, so that the camera body can commence with the new data communication.

In a new data communication, when the terminal DATA drops to "L", the terminal $\overline{RESB}$ also drops to "L", so that only the lens CPU 30 is reset.

Communication Between Camera Body and Zoom Lens

The communication between the camera body 1 and the zoom lens 2 is carried out as follows:

The indication CPU 11 causes the terminal CONT to drop to "L" and reads the open F-number and the minimum F-number data. Thereafter, the terminal CONT and the terminal RES (Fmin3) are both set at "H", so that the lens interface 41 and the lens CPU 30 are reset. Consequently, the indication CPU 11 is transferred to the initial value data inputting state.

The lens CPU 30 sets the initial value data read through the zoom code member 37 or the calculated initial value data in a shift register within the lens interface 41, asynchronously with the clock signal output from the camera body 1.

The initial value data set in the shift register is successively outputted from the DATA terminal synchronously with the clock signal from the camera body 1. The old data communication mentioned above is carried out by hardware within the lens interface 41. In the illustrated embodiment, 19 bytes of data are transferred to the camera body 1.

Upon completion of the old data communication, the $\overline{KAFEND}$ terminal of the lens interface 41 drops to "L", which indicates the completion of the old data communication. As a result, the lens CPU 30 is ready to receive a commencement signal for a new data communication from the camera body 1.

When the lens CPU 30 receives a signal for the commencement of a new data communication from the camera body 1, the DATA (Fmin2) terminal which has been "H", drops to "L" and then again returns to "H" thereafter. This makes it possible to commence the new data communication.

In the new data communication, data is transferred from the zoom lens 2 to the camera body 1, or from the camera body 1 to the zoom lens 2, in accordance with a command code outputted from the camera body 1. The command code and the data transferred between the zoom lens 2 and the camera body 1 are, for example, as shown in Table 1 below.

TABLE 1

| Zoom Lens → Camera Body | |
|---|---|
| AF information | 0011.0001(31H) |
| AF information | 0011.0010(32H) |
| all data | 0011.0011(33H) |
| each single bite | 0101.XXXX(5XH) |
| lens information 1 | 0110.0000(60H) |
| lens information 2 | 0110.0001(61H) |
| Camera Body → Zoom Lens | |
| focal length information fWide | 0110.0010(62H) |
| focal length information fTele | 0110.0011(63H) |
| focal length information fX(present) | 0110.0100(64H) |
| lens drive information | 0110.0110(66H) |
| lens accommodation | 1001.0000(90H) |
| lens return | 1001.0001(91H) |
| PH ON | 1001.0010(92H) |
| PH OFF | 1001.0011(93H) |
| effective AF F No. | 1001.0100(94H) |
| switching command | 1100.1000(C8H) |
| sleep | 1100.0001(C1H) |
| test mode | 1111.XXXX(FXH) |

The new data communication is carried out synchronously with the clock signal outputted from the zoom lens 2 (clock pulse generating circuit 43). For example, the lens CPU 30 outputs the clock pulse from the SCK terminal and receives the data outputted from the camera body 1 at the DATA terminal thereof.

If the data is a data reading command, the lens CPU 30 first outputs a receipt acknowlegment signal and then outputs the data designated by the command from the terminal DATA. Upon completion of the data output, the lens CPU 30 causes the DATA terminal to drop to "L" and return to "H" again thereafter to transmit the completion of the data output to the camera body 1.

If the data is a sleep command, the lens CPU 30 comes to a sleep state, in which the lens CPU 30 stops the operation of the clock pulse generating circuit 43.

When the DATA terminal becomes "L" in the sleep state, the terminal $\overline{RESB}$ drops to "L", so that only the lens CPU 30 is reset. As a result, the lens CPU 30 starts to drive the clock pulse generating circuit 43 so that a new data communication can be started. Note that the lens CPU 30 also starts when the zoom switches SWPZ1 and SWPZ2 are actuated.

Timer Routine of Indication CPU

Figure 6:
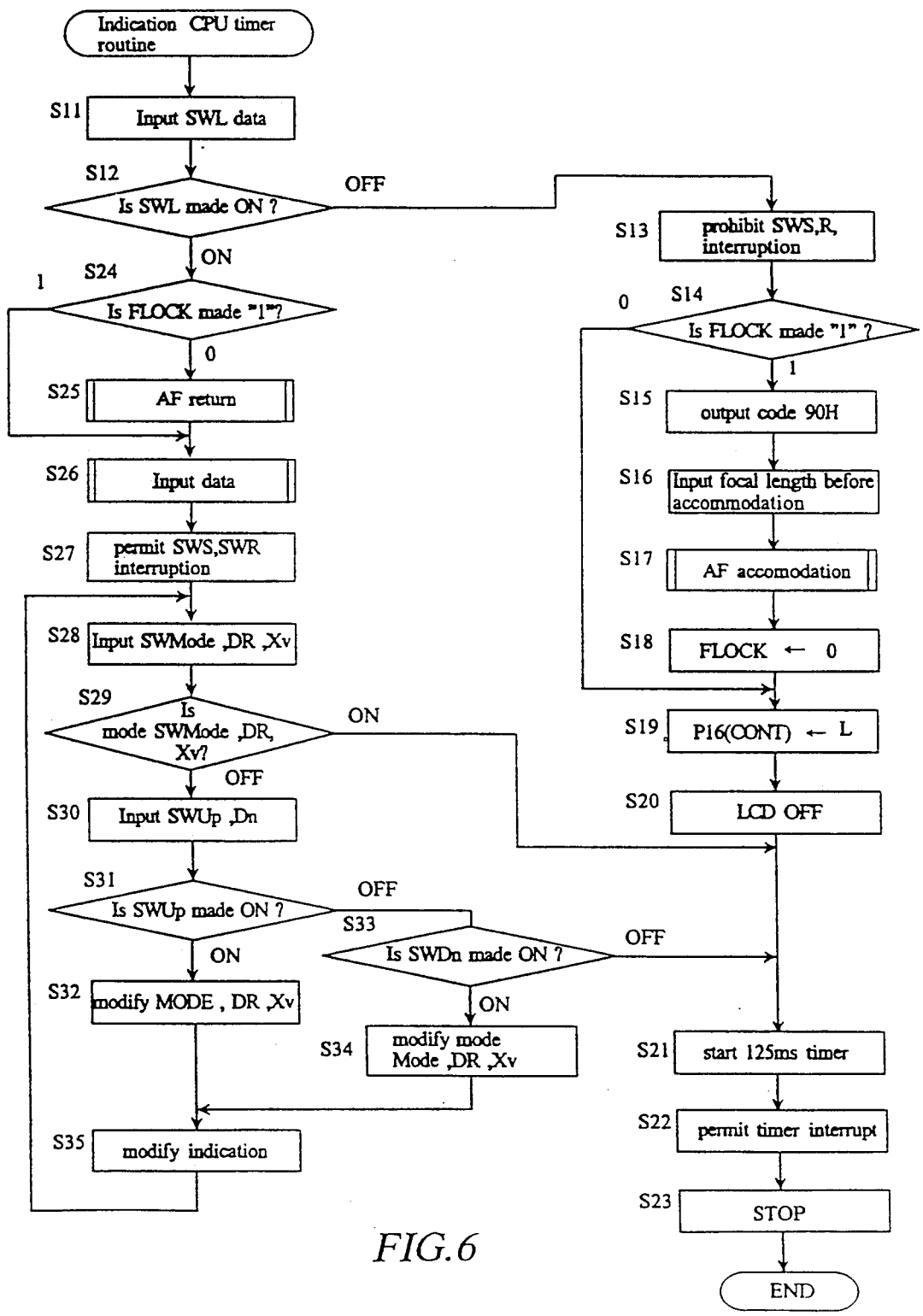
FIG. 6 is a flow chart of a timer routine of an indication CPU of a camera body.

The main operation (timer routine) of the indication CPU 11 will be explained with reference to FIG. 6. The main operation is performed by the indication CPU 11 in accordance with a program stored in an internal ROM 11a of the indication CPU 11.

The indication CPU 11 checks whether the lock switch SWL is turned ON or OFF at steps S11 and S12. If the lock switch SWL is turned OFF, the interruption of the operation by the switch is prohibited (step S13), and then, the state of the lock flag FLOCK is checked to check the accommodation of the lens (step S14).

When the lock SWL is OFF a picture cannot be taken and the photographing lens is retracted thus realizing a compact and portable camera.

To this end, in the camera system of the present invention, the zoom lens 2 is automatically retracted to reduce the length thereof by the automatic focusing mechanism 31 and the automatic power zoom mechanism 32 when the lock switch SWL is turned OFF.

However, a photographer may also turn the lock switch SWL OFF when he or she does not desire that the photographing lens in the camera be retracted. For instance, the lock switch SWL may be turned OFF to reduce the power consumption while a photographer is waiting for the next shot, while maintaining the focal length and focal point as they are. In such a case, if the photographing lens is automatically retracted when the lock switch SWL is turned OFF, the focal length and focal point will vary, requiring the photographer to troublesomely readjust the focal length and focal point.

To prevent this, in the camera system according to the present invention, at the moment when the lock switch SWL is switched from ON to OFF, the focal length and the focal point (axial position of the focusing lens group or the object distance) are memorized and the photographing lens is retracted. When the lock switch SWL is turned ON again, the focal length and the focal point, before the retraction of the photographing lens, are automatically obtained, regardless of the photographer's intention when the lock switch SWL is turned OFF. Thus, according to the present invention, the problem mentioned above can be eliminated.

In the camera system of the present invention, the retraction and return operations with respect to the automatic focusing mechanism 31 are carried out by the main CPU 10, and the retraction (accommodation) and return operations, with respect to the power zoom mechanism 32, are carried out by the lens CPU 30, respectively. Note that the main CPU 10 and the lens CPU 30 are supplied with electrical power only when the lock switch SWL is turned ON. Otherwise, no power is supplied thereto. Therefore, the data of the retraction and the return is controlled by the indication CPU 11 which always operates.

The lens retraction (accommodation) operation is effected in steps S15 through S18. Since the zooming operation is controlled by the lens CPU 30, command code 90H for the accommodation of the lens is sent to the lens CPU 30, and the focal length data before the accommodation, is inputted from the zoom code member 37 to the lens CPU 30. Since the automatic focusing mechanism 31 is controlled by the camera body side, the operation is performed by the main CPU 10 in an AF accommodation sub-routine at step S17.

Upon completion of the AF accommodation, the lock flag FLOCK is set to "0" (step S18), and control proceeds to step S19. If the lens has been already accommodated or retracted, since the lock flag FLOCK is "0," control skips step S15 through step S18.

At step S19, terminal P16 (terminal CONT) drops to "L" and then the power source of the lens CPU 30 and the LCD 12 are turned OFF (step S20). Thereafter, the timer routine is intermittently performed at 125 ms cycle (steps S21 through S23). Namely, the operation of steps S11 through S23 is intermittently repeated during the period in which the lock switch SWL is OFF.

If the lock switch SWL is turned ON, the indication CPU 11 determines the state of lock flag FLOCK at step S24. Since the lock flag FLOCK is "0" when the lock switch SWL is turned ON for the first time, the AF return operation is performed by the main CPU 10 to return the focal point of the photographing lens to the one before the accommodation or retraction (steps S12, S24 and S25).

At step S26, a lens data inputting sub-routine is called to determine the type of attached lens in accordance with the input data. If necessary and if possible, the lens CPU 30 performs the return of the zoom mechanism 31.

Upon completion of the data input operation, interruption of the control by the photometer switch SWS and the release switch SWR is permitted so that the release can be effected. Thereafter, control proceeds to step S28.

When the mode switch SWM, the drive switch SWDR, the exposure correction switch SWXV, the up-switch SWUP, and the down-switch SWDN are actuated, the changing operation of the mode, etc., and the indication operation of the selected mode are performed at steps S28 through S35.

If none of these switches are actuated, the intermittent operation is performed in accordance with the 125 ms timer operation (steps S29, S31, S33, S21).

Input operation of Lens Data

The input operation (data communication) of the lens data between the camera body 1 and the zoom lens 2 at step S26 of the timer routine will be described below.

Figure 7A:
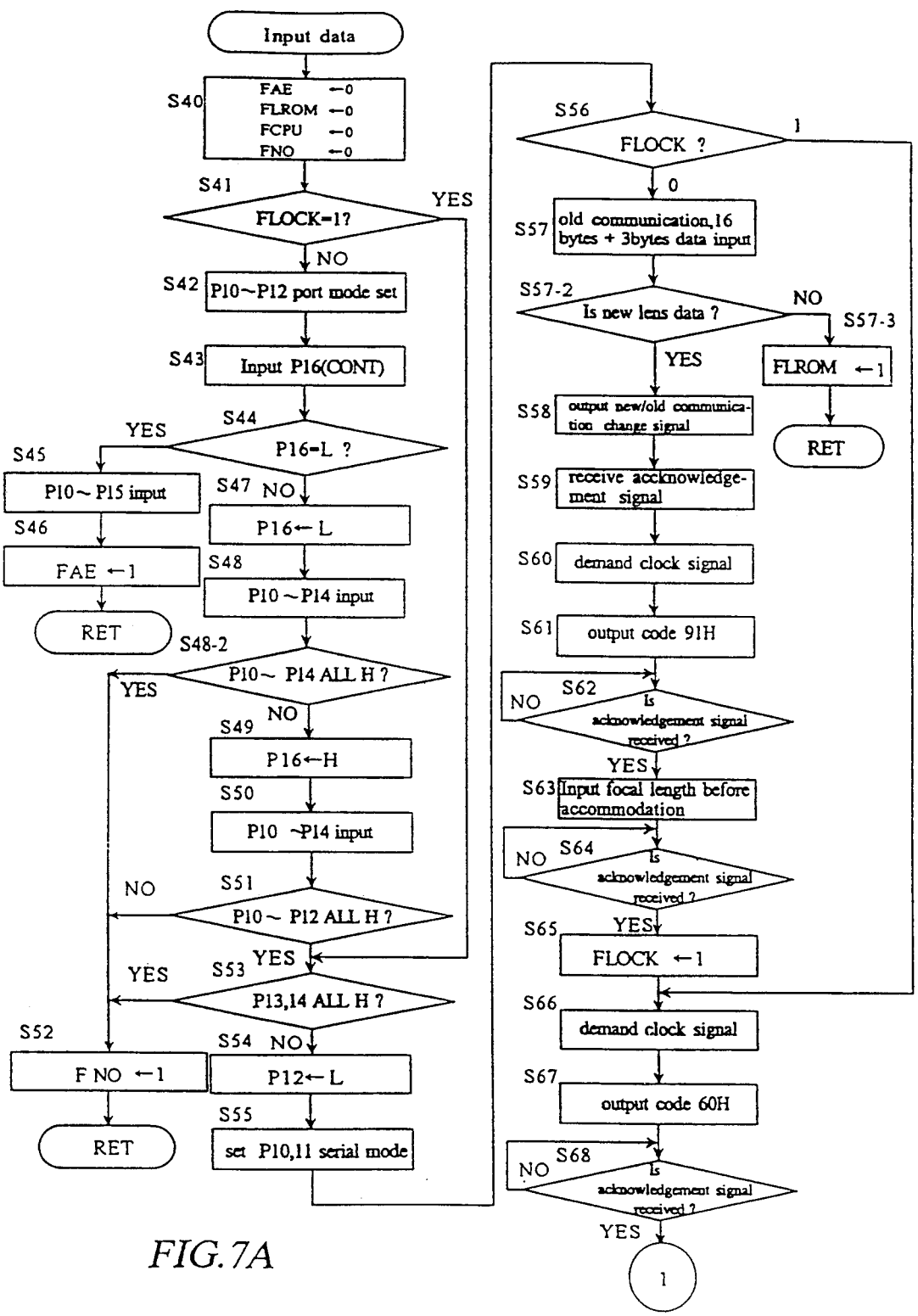
FIGS. 7A, 7B and 7C are flow charts of a data communication of a camera body.
Figure 7B:
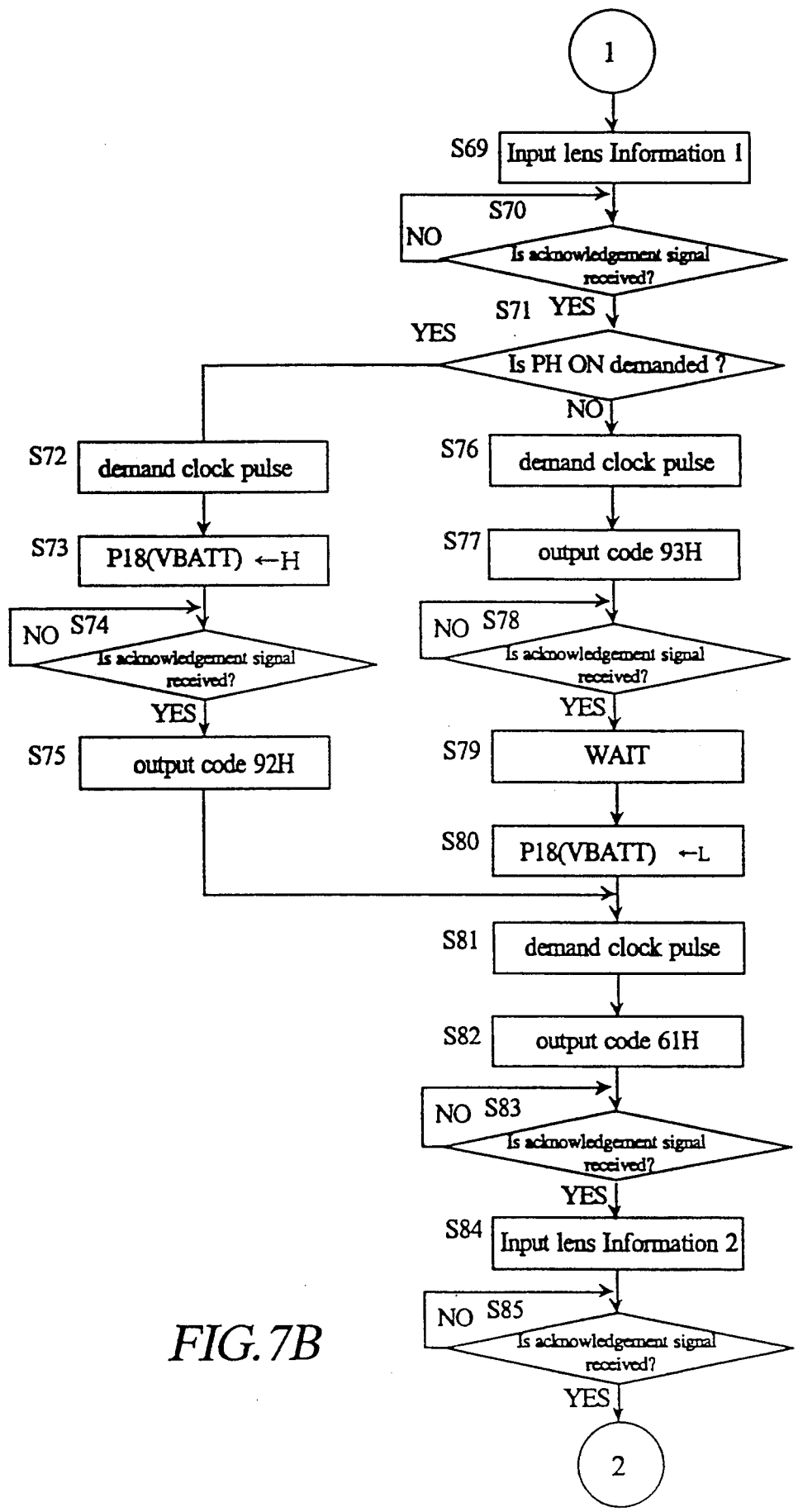
Figure 7C:
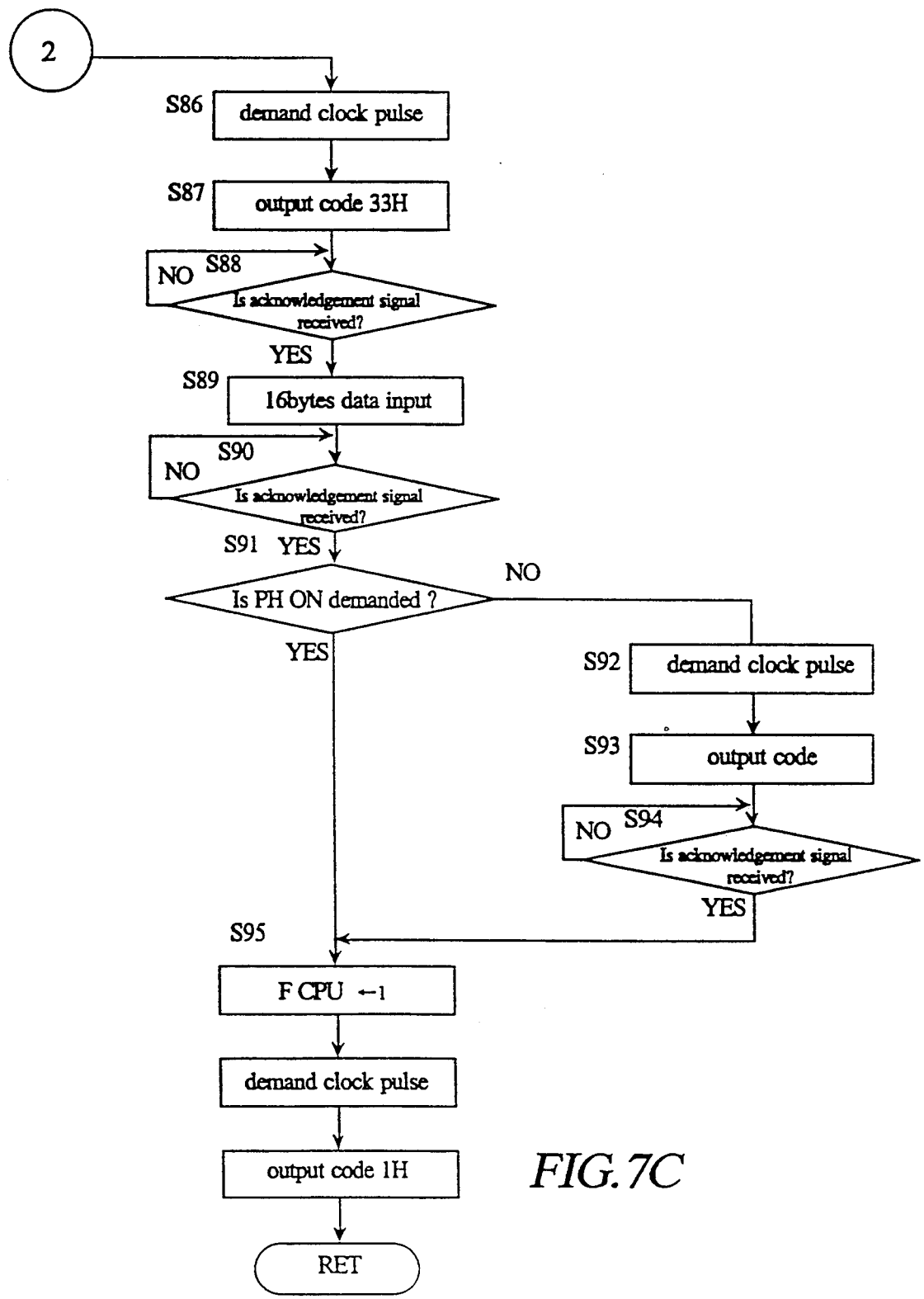

The discussion will first be directed to the operation of the camera body 1 with reference to FIGS. 7A–7C. This operation is carried out by the indication CPU 11.

First, four lens flags FAE, FCPU, FLROM and FNO, for discriminating the lens are reset to "0" (step S40). The lens flag FAE discriminates a conventional (old) AE lens having no lens ROM. The lens flag FCPU discriminates a new AE lens having a lens CPU, such as, for example, the zoom lens 2 which has the lens CPU 30 shown in FIGS. 1 and 3, etc. The lens flag FLROM discriminates a conventional AE lens having a lens ROM. Lastly, the lens flag FNO determines if the lens is not attached to the camera body or if there is trouble with the photographing lens.

After that, whether or not the lock flag FLOCK is "1" is checked at step 41. Since control proceeds to step S41 for the first time after the lock switch SWL is turned ON, flag FLOCK is "0," so that the control proceeds to step S42. Conversely, after the second time and when the lens has a lens CPU, the flag FLOCK is "1," so that control jumps to step S53.

At step S42, terminals P10 through P12, which are used for serial communication with the zoom lens 2, are set at the input mode and then the level of terminal P16 (the contact Cont) is inputted and checked (steps S43 and S44).

If there is no contact Cont on the mounted lens, the Cont contact on the camera body side comes into contact with the surface of the lens mount, and is accordingly grounded, to detect that the mounted lens is an old AE lens having no lens ROM.

When the mounted lens is the old AE lens, the levels of terminals P10 through P15 are inputted, to read the data on the open F number, the maximum F number and the diaphragm A/M switching data, and the old AE lens flag FAE is set to "1" (steps S45 and S46). Control is then returned.

If a photographing lens is not mounted or if a lens having the lens data is mounted, the level of the Cont contact is "H." Consequently, the level of terminal P16 drops to "L" to stop the supply of electrical power to the lens side. Thereafter, the levels of the other terminals P10 through P15 are inputted (step S48).

Figure 3:
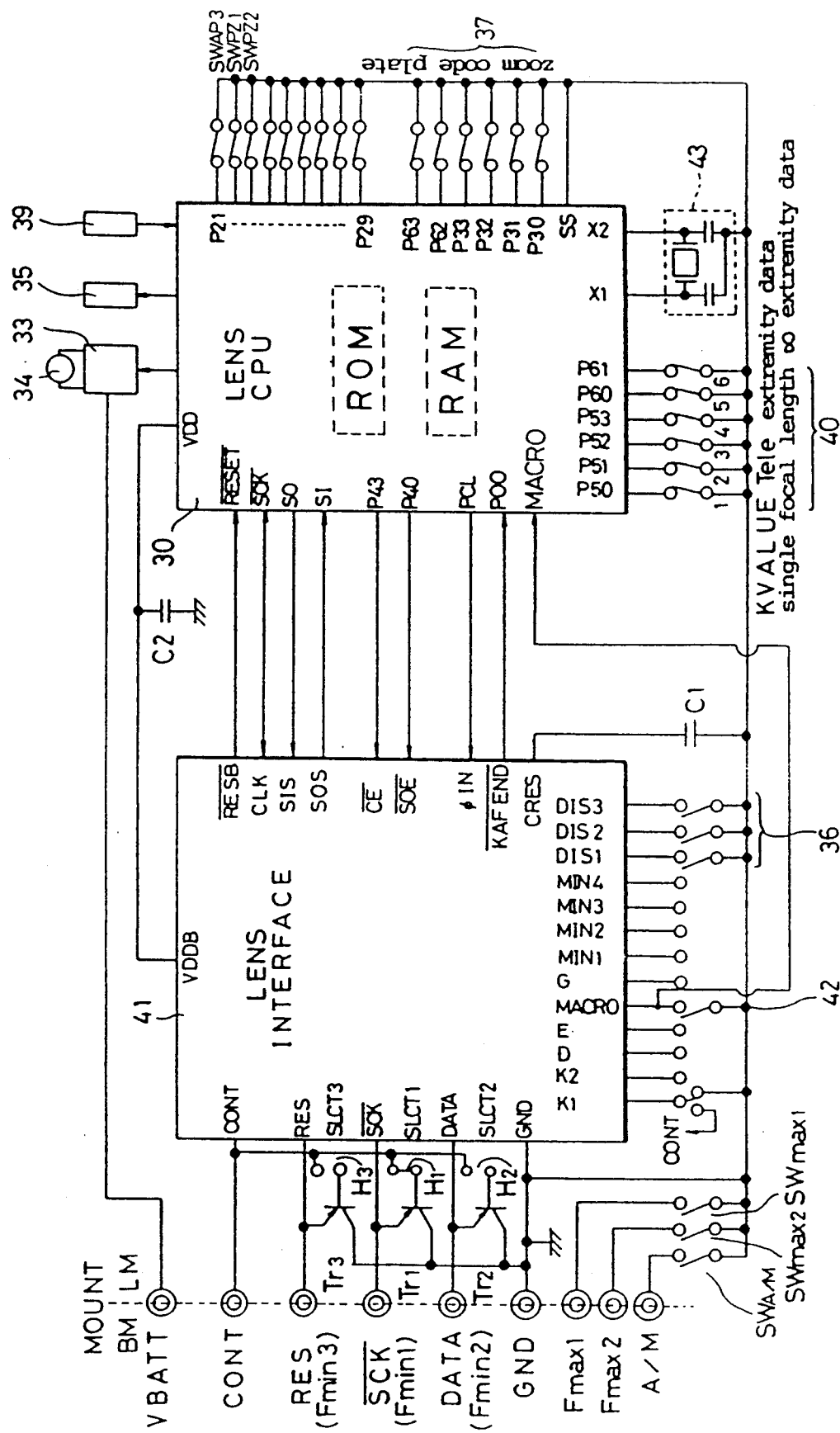
FIG. 3 is a block diagram of a main circuit arrangement of a photographing lens shown in FIG. 1.

As can be seen in FIG. 3, when the transistors Tr are connected to the lens contacts Fmin1 through Fmin3, the open F number can be detected in accordance with the combination of levels of the lens contacts Fmin1 through Fmin3, depending on the combination of ON/OFF states of the transistors Tr. The maximum F number can be detected in accordance with the combination of lens contact levels Fmax1 and Fmax2, depending on the combination of ON/OFF states of the switches SWFmax1 and SWFmax2. The level of the diaphragm A/M contact is used to detect whether the diaphragm is automatic or manual.

Thereafter, whether the levels of terminals P10 through P14 are all "H" is checked. If the levels of P10 through P14 are all "H," the no lens flag FNO, which represents that no lens is attached, is set at "1" (steps S48-2, S52). Thereafter, control is returned.

If any one of the levels of the terminals P10 through P14 is "L," terminal P16 is set to "H" to supply power to the zoom lens so that the lens CPU and the lens ROM are activated. Thereafter, the levels of terminals P10 through P14 are inputted (steps S49 and S50).

If any one of the levels of terminals P10 through P12 is "L," the no lens flag FNO is set at "1," since it is then considered that there is some trouble with the photographing lens (lens ROM or lens CPU) (steps S51 and S52).

If all of the levels of terminals P10 through P12 are "H," whether the levels of terminals P13 and P14 are both "H" is checked at step S53. If both the levels of both terminals P13 and P14 are "H," the no lens flag FNO is set at to "1" (step S52), since it is then considered that no photographing lens is attached. Control is then returned.

If at least one of the terminals P13 and P14 is "L," the level of terminal P12 drops to "L" (step S54), and terminals P10 and P11 are set to the serial communication mode (step S55), since the mounted lens is a new CPU lens (zoom lens). Thereafter, control proceeds to step S56.

At step S56, whether the lock flag FLOCK is "1" is checked. Since FLOCK is "0" when control proceeds to step S56 for the first time after the lock switch SWL, control proceeds to step S57 to perform the old data communication. Conversely, if FLOCK is "1," after the second time, control skips steps S57 through S65 to step S66, so as not to carry out the old data communication.

At step S57, the lens data of 16 bytes and the rear converter data of three bytes are inputted through the old communication.

When the input of the data by the old communication is completed, whether or not the lens is the new lens (zoom lens) having the lens CPU based on the input data is checked. If the lens is not a new lens, a lens is the conventional AE lens having a lens ROM. Accordingly, flag FLROM is set to "1" (steps S57-2 and S57-3). Thereafter, control is returned.

If the lens is a new lens, the new/old switching signal is outputted to the terminal DATA (step S58), so that the clock demand signal is outputted to the lens side in response to an acknowledgement signal issued from the lens side, whereby the lens CPU 30 outputs the clock signal (steps S59 and S60).

Thereafter, the lens return command code 91H is sent to the lens CPU 30, which is ready for returning the power zoom mechanism at step S61. Control waits until the acknowledgement signal is issued from the lens CPU 30 (step S62).

Upon receipt of the acknowledgement signal, before accommodation, the focal length data is sent to the lens CPU 30, which then returns the power zooming (step S63). When the returning is finished, which can be detected by an issuance of the acknowledgement signal from the lens CPU 30, lock flag FLOCK is set at "1" (steps S64 and S65). Thereafter, control proceeds to step S66.

At step S66 a clock demand signal is outputted so that the lens CPU 30 outputs the clock signal. A command code (lens information 1) 60H is outputted synchronously with the clock signal, and control does not proceed until the acknowledgement signal is issued (steps S67 and S68). The command code 60H is used to read lens information including the switch setting data on the lens side and the power hold demand signal, etc.

Upon receipt of the acknowledgement signal the lens information output from the lens CPU 30 is received (step S69). The completion of the receipt of the lens information is detected by the receipt of the acknowledgement signal fed from the lens CPU 30 (step S70).

Upon receipt of the acknowledgement signal it is checked whether the transferred data demands the power hold at step S71. If there is a power hold demand, the lens CPU 30 is requested to output the clock signal (step S72). Thereafter, the level of the terminal P18 becomes "H" and the control does not proceed until acknowledgement signal is issued from lens CPU 30 (stepS S73 and S74).

Upon receipt of the acknowledgement signal, power hold-ON code 92H is outputted (step S75). Thereafter, control proceeds to step S81.

If there is no power hold demand at step S71, the output of the clock signal is demanded at step S76. Thereafter, power hold-OFF code 93H is outputted synchronously with the clock signal (step S77). After that, whether the acknowledgement signal is outputted from the lens CPU 30 is checked at step S78.

Upon receipt of the acknowledgement signal, the level of terminal P18 becomes "L", after a lapse of a predetermined time (steps S79 and S80), to stop the supply of power to PZ motor 34. Then, the control proceeds to step S81.

At step S81, the output of the clock signal is demanded. The demand code 61H which demands the lens information 2 is outputted synchronously with the clock signal at step S82. Thereafter, whether the acknowledgement signal is outputted is checked at step S83.

If the acknowledgement signal is received, the subsequent lens information 2 is then received at step S84. Thereafter, whether the acknowledgement signal is outputted is checked at step S85.

If the acknowledgement signal is received at step S85, the clock signal is demanded at step S86. Demand code 33H for demanding all the data is outputted synchronously with the clock signal at step S87. Thereafter, whether the receipt acknowledgement signal is received is checked at step S88.

If the receipt acknowledgement signal is received, the subsequent data for 16 bytes is inputted at step S89. Thereafter, whether a transmission completion acknowledgement signal is received is checked at step S90.

If the transmission completion acknowledgement signal is received at step S90, whether there is a power hold demand is checked at step 91. If there is a power hold demand, the new AE lens flag FCPU is set to "1" (step S95). The indication CPU 11 demands the clock signal from the lens CPU 30. Thereafter, a sleepcode (C1H) is output synchronously with the clock signal of the lens CPU 30, and the control is returned.

Conversely, if there is no power hold demand at step S91, the clock signal is demanded at step S92 and a predetermined code is outputted (step S93). Thereafter, whether the receipt acknowledgement signal is received is checked at step S94. If the receipt acknowledgement signal is received, the new CPU lens flag FCPU is set at "1".

The indication CPU 11 demands the clock signal from the lens CPU 30. Thereafter, a sleep code (C1H) is outputted synchronously with the clock signal of the lens CPU 30 and control is then returned (steps S96, S97).

Namely, the indication CPU 11 causes the lens CPU 30 to sleep every time the communication with the lens CPU 30 is finished.

In the second data inputting operation and those subsequent thereto, since the lock flag FLOCK has been set at "1" at step S65, the checking of whether the lens is the old AE lens, etc. (steps S42 through S48-2), the old data communication, and the output of the focal length before the accommodation (retraction) at steps S57 through S65 are not carried out. This decreases the communication time in the 125 ms timer operation, resulting in a reduced power consumption.

Main Routine of Lens CPU

Figure 8:
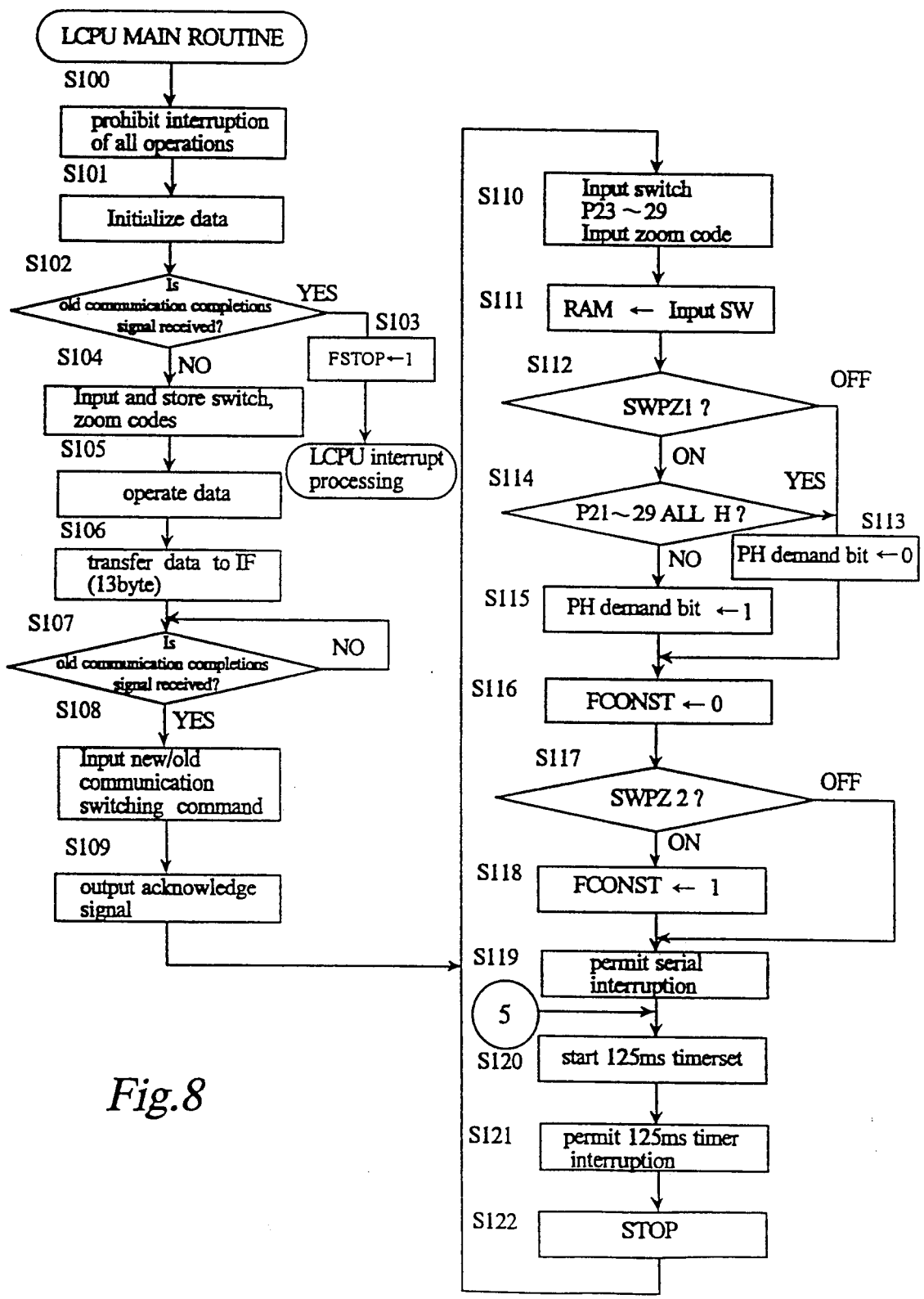
FIG. 8 is a flow chart of a main operation of a lens CPU of a photographing lens; and, FIGS. 9A, 9B and 9C are flow charts of data communication of a lens CPU of a photographing lens.

The main operation of the lens CPU 30 will be described below with reference to FIG. 8.

The lens CPU 30 is supplied with power through the CONT contact by the indication CPU 11 and starts when the reset is released, after the levels of the Cont contact and the RES terminal are set at "H" and "L", respectively.

The lens CPU 30 performs the initialization after the interruption by all of the operations is prohibited (steps S100 and S101).

After the initialization is completed, whether or not the old communication completion signal is output from the lens interface 41 is checked. That is, whether the level of the terminal $\overline{\text{KAFEND}}$ is "L" is checked at step S102. If the old communication completion signal is outputted, stop flag FSTOP is set "1," and then a lens CPU interruption starts (step S103).

Conversely, if the old communication completion signal is not output, which means that control is still in the old communication, the states of the switches are inputted and stored in the RAM to successively perform the predetermined arithmetic operations (step S105). During these operations, the initial value data is loaded in a 24 bit shift register in which the data is shifted and serially outputted to the indication CPU 11.

Every time the predetermined arithmetic operations are finished, the results of the arithmetic operations (arithmetic data) are outputted to the lens interface 41 (step S106). The arithmetic data output to the lens interface 41 is then loaded in the 24 bit shift register 56 by hardware and successively transferred to the indication CPU 11 through the DATA terminal, as mentioned above.

Upon completion of the outputting of the arithmetic data to the indication CPU 11, whether the old communication completion signal is outputted is checked at step S107. In this state, the calculated data transferred to the lens interface 41 is transferred to the indication CPU 11. If a rear converter is provided, the data for three bytes is transferred from the rear converter to the indication CPU 11.

When the transfer of the 19 bytes data (including the initial data of three bytes, the calculated data of 13 bytes and the rear converter data of three bytes) is completed, the lens interface 41 outputs the old communication completion signal. Namely, terminal $\overline{\text{KAFEND}}$ drops to "L".

When the old communication completion signal is received, the new/old communication switching signal is inputted from the indication CPU 11 (step S108) and acknowledgement signal is issued (step S109). This transfers the old communication to a new communication.

In the new communication, levels of the terminals P23 through P29 are inputted at step S110 and the states of the switches are memorized in the internal RAM (step S111).

Thereafter, the state of the power zoom switch SWPZ1 is checked to determine whether the power zoom mode or the manual zoom mode is selected (step S112). If the power zoom switch SWPZ1 is turned OFF, the mode is the manual zoom mode so that the power hold demand bit (flag) is set to "0" to stop the supply of power to the PZ motor 34. Thereafter, control proceeds to step S116.

If the power zoom switch SWPZ1 is turned ON, the mode is the power zoom mode. Accordingly, the levels of terminals P21 through P29 are inputted to check the states of the switches relating to the zooming operation (step S114). If the levels of all of the terminals P21 through P29 are "H", since no operation for the power zooming is effected, the power hold demand bit is set at "0". Thereafter, the control proceeds to step S116.

If the level of any of the terminals P21 through P29 is "L", since the switch connected to the associated terminal relating to the power zooming is turned ON, the power hold demand bit is set at "1" to supply the PZ motor 34 with power (step S115). Thereafter, control proceeds to step S116.

At step S116, a constant image magnification flag FCONST is set to "0," and then, control proceeds to step S117. The constant image magnification flag FCONST detects whether the constant image magnification mode is set. In the illustrated embodiment, the constant image magnification mode referred to means a mode in which when an object at an object distance D is in focus at a specific focal length f, even if there is a small change ΔD in the object distance, the power zooming is controlled to adjust the focal length f' to thereby satisfy the following relationship:

$$D/f = (D + \Delta D)/f'.$$

At step S117, whether the power zoom switch SWPZ2 is turned ON is checked. If the power zoom switch SWPZ2 is turned ON, the constant magnification flag FCONST is set at "1," (step S118) and then, control proceeds to step S119. Conversely, if the power zoom switch SWPZ2 is not turned ON, control directly proceeds to step S119 without setting the constant magnification flag FCONST to "1."

After that, at step S119, serial interruption is permitted. Thereafter, the timer operation is set to intermittently perform the routine of steps S120 through S122 (steps S120 and S121) at 125 ms cycle. Thereafter, the operation stops at step S122. The lens CPU 30 performs the operations of steps S110 through S122 every 125 ms in accordance with the setting of the timer operation.

Serial Interruption of Lens CPU

Figure 9A:
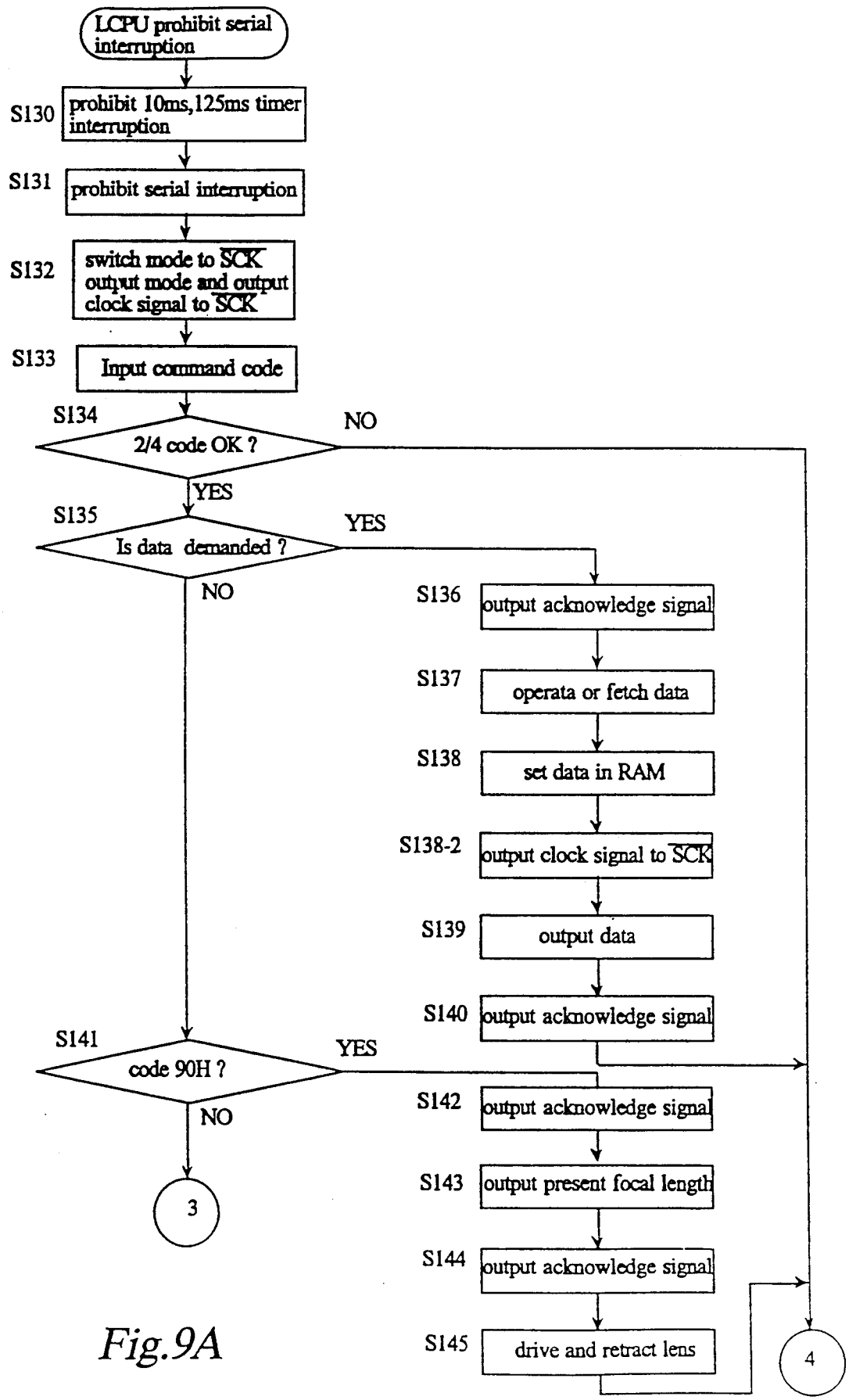
Figure 9B:
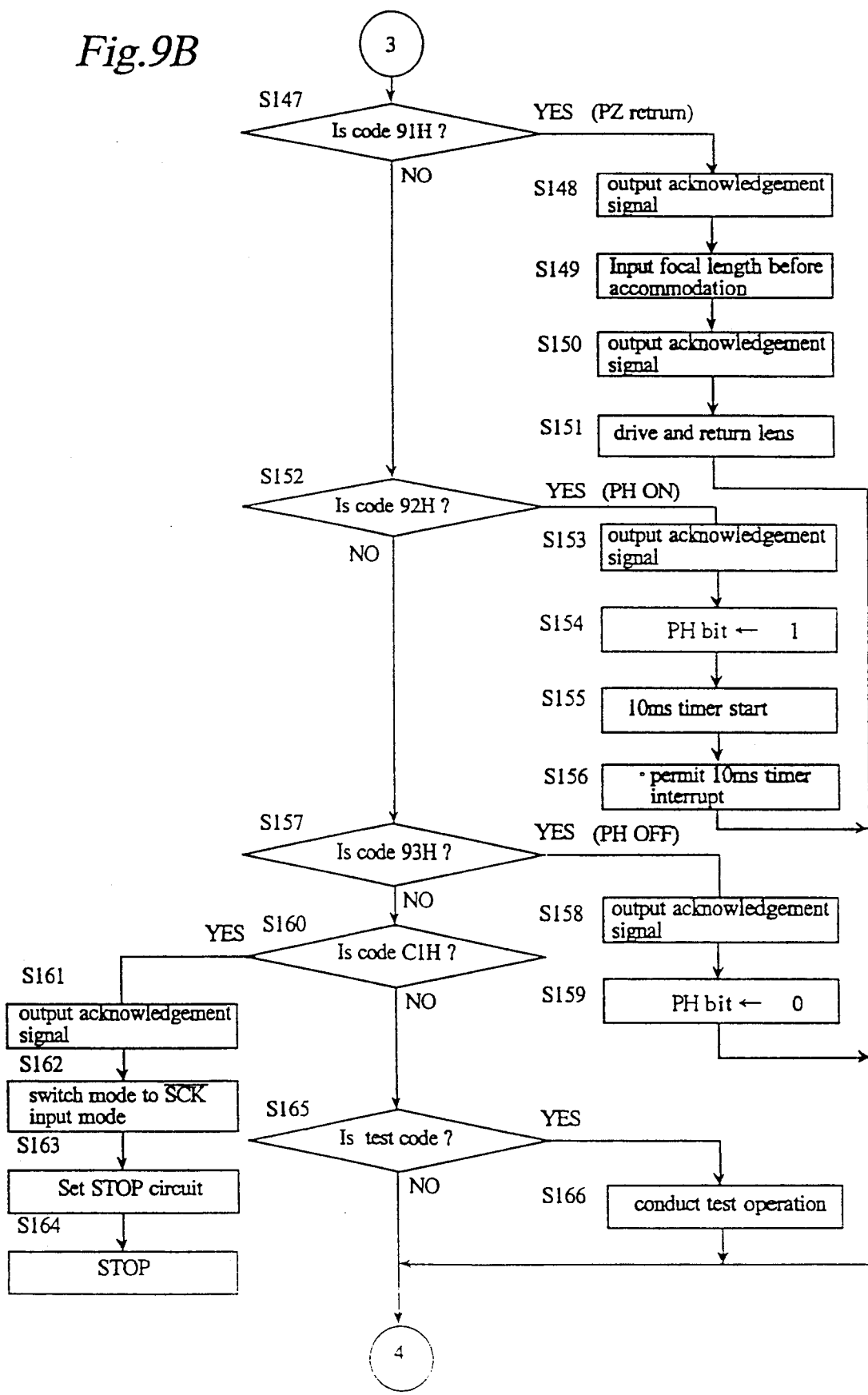
Figure 9C:
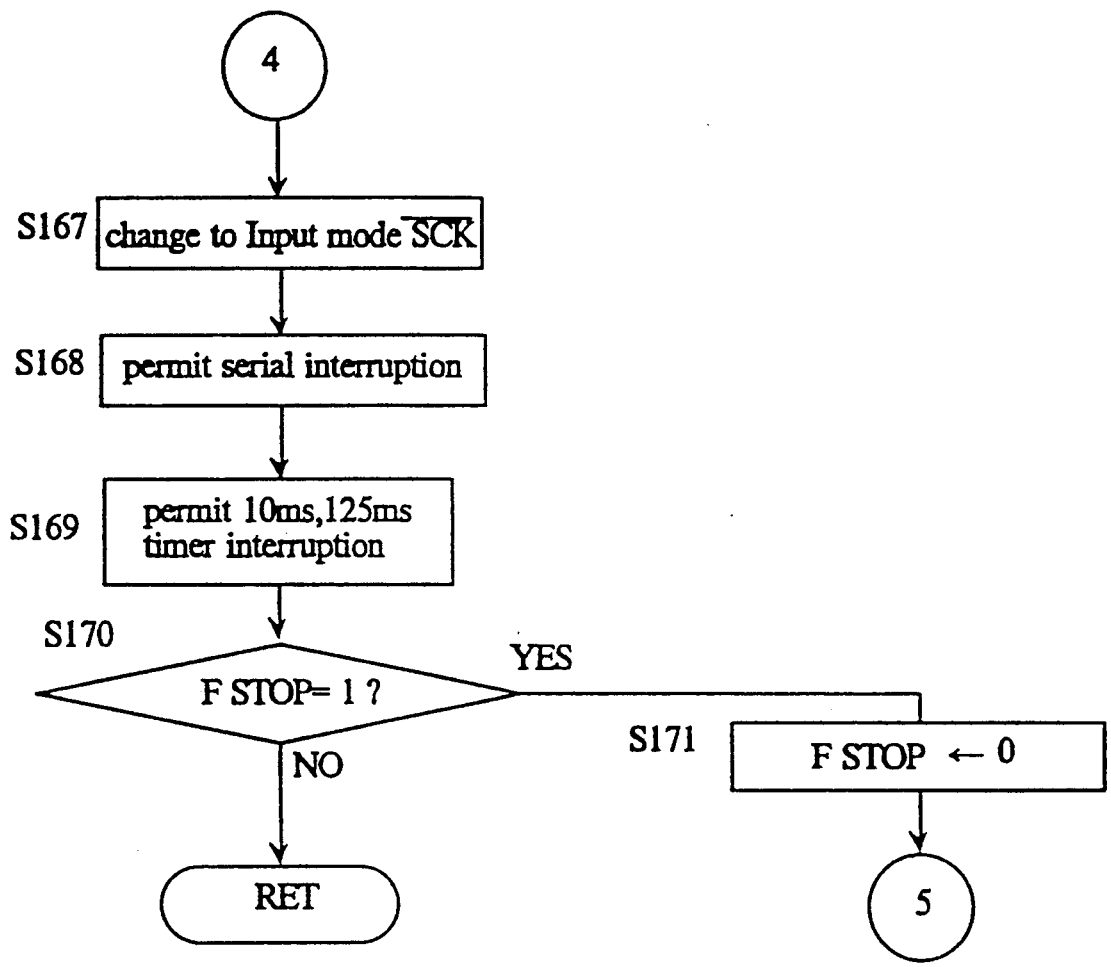

FIGS. 9A through 9C show flow charts for the new communication operation when the serial communication is interrupted by the indication CPU 11 of the camera body 1. When the indication CPU 11 causes the level of the DATA terminal to drop to "L", the lens CPU 30 enters the new communication operation.

First, the lens CPU 30 prohibits the timer interruption by the 10 ms timer and the 125 ms timer and the serial interruption (steps S130 and S131). Note that the 10 ms timer interruption is a power zoom control operation in which, when the serial interruption is permitted, power zooming is controlled at an interval of 10 ms.

Thereafter, the mode is switched to the $\overline{\text{SCK}}$ output mode in which the clock signal is outputted from the lens CPU 30 to output the serial clock signal to terminal $\overline{\text{SCK}}$ (step S132). The communication with the camera body 1 is carried out synchronously with the clock signal outputted from the photographing lens 2.

At step S133, the command code from the indication CPU 11 is inputted. Thereafter, whether a 2/4 code of the command code thus inputted is correct is checked at step S134. The 2/4 code means the first four bits of the command code, of which two bits are always "H" and the remaining bits (two bits) are always "L."

If these requirements are not satisfied, no operation is performed, as an input error of the command code occurred. Thus, control jumps to step S167. At step S167, the mode is switched to the $\overline{SCK}$ input mode, in which the serial clock is inputted from the camera body side. Thereafter, the 10 ms timer interruption and the 125 ms timer interruption and the serial interruption are permitted (steps S168 and S169). At step S170, if the stop flag FSTOP is "0," control is directly returned and if the stop flag FSTOP is "1," control is returned to step S120 of the CPU main routine (shown in FIG. 8) after the stop flag FSTOP is set to "0" (step S171).

If the 2/4 code is correct, it is determined whether the command code is the data demand signal at step S135. If the command code is the data demand signal, the acknowledgement signal is outputted to calculate the demanded data or to input the data of the code plate and the switches etc., to store the data in the internal RAM (steps S136 through S138).

The stored data is serially outputted synchronously with the $\overline{SCK}$ clock signal at step S139. Upon completion of the output of the stored data, an acknowledgement signal is outputted to complete the data transfer (steps S138-2, S139 and S140). Thereafter, control proceeds to step S167.

If the first four bits are not the command code, whether the latter is code 90H, 91H, 92H, 93H, the sleep code or the test code is checked (step S141, step S147, step 152, step 157, step S160 and step S165).

If the command code is code 90H (lens accommodation), the acknowledgement signal is sent to the indication CPU 11 (step S142). Thereafter, the present focal length data is sent from the zoom code plate 37 to the indication CPU 11 (step S143). Upon completion of the feeding of the focal length data to the indication CPU 11, the acknowledgement signal is outputted to accommodate or retract the photographing lens (steps S144 and S145). Thereafter, control proceeds to step S167.

If the command code is code 91H (lens return), the receipt acknowledgement signal is sent to the indication CPU 11 (step S148). Thereafter, the focal length data before accommodation is inputted from the indication CPU 11 (steps S149). Upon completion of the inputting of the focal length data before, accommodation, the acknowledgement signal is outputted to finish the inputting of the focal length data before accommodation (step S150). Thereafter, the PZ motor 34 is driven to set the focal length to be the focal length before accommodation at step S151. Thereafter, control proceeds to step S167.

If the command code is code 92H (power hold ON), a receipt acknowledgement signal is outputted at step S153. Thereafter, power hold demand bit PHbit is set to "1" (step S154), and the 10 ms timer begins permitting the 10 ms timer interruption (steps S155 and S156). Thereafter, control proceeds to step S167.

If the command code is code 93H (power hold OFF), an acknowledgement signal is outputted (steps S157 and S158), and the power hold bit is reset to "0" (step S159). Thereafter, control proceeds to step S167.

If the command code is none of the codes 90H, 91H, 92H and 93H, whether the command code is sleep code C1H is checked at step S160. If the command code is the sleep code C1H, a receipt acknowledgement signal is outputted to change the mode to the $\overline{SCK}$ input mode in which the level of terminal $\overline{CE}$ drops to "L" (steps S161 and S162). Consequently, control stops. Note that the "sleep" referred to herein means that control does not proceed.

The lens CPU 30, which sleeps, is driven by the indication CPU 11 or the zoom switch SWAP3, SWPZ1 or SWPZ2, etc. Namely, for instance, if the clock signal is inputted to terminal $\overline{SCK}$ from the indication CPU 11 and terminal DATA drops to "L", the lens CPU 30 is reset. If the data is inputted to terminal DATA, the lens CPU 30 switches the mode to the $\overline{SCK}$ terminal output mode so that the LCPU interruption routine can be carried out. When the zoom switch SWPZ1 or SWPZ2 is turned ON, the power zoom motor 34 is driven to control the power zooming.

If the command code is not the sleep code C1H, whether the command code is test code FXH is checked at step S165. If the command code is the test code FXH, a test operation is performed at step S166, and then, control proceeds to step S167. If the command code is not the test code FXH, the control skips step S166 to step S167. The test mode is not used while taking a picture, but instead is used to effect a predetermined data communication without mounting the photographing lens to the camera body, for example, upon assembly of the lens or adjustment thereafter, etc.

At step S167, the mode is changed to the $\overline{SCK}$ input mode, in which the clock signal can be received from the indication CPU 11. Thereafter, the serial interruption, the 10 ms timer interruption and the 125 ms timer interruption are permitted (steps S168 and S169).

Thereafter, at step S170, whether stop flag FSTOP is "1" is checked. If FSTOP is "1," it is reset to "0" (step S171). Control is returned to step S120 of the main routine of the lens CPU. Conversely, if FSTOP is "0" at step S170, control is directly returned.

As can be understood from the above discussion, according to the present invention, if the photometer switch SWS is not turned ON when the lock switch SWL of the camera body 1 is turned ON, one old communication and one new communication are carried out between the indication CPU 11 (camera body 1) and the lens CPU 30 (zoom lens 2). Upon completion of the new communication, the indication CPU 11 sends the sleep code to the lens CPU 30, so that the lens CPU 30 sleeps. This reduces the electrical power consumption of the camera system.

Thereafter, the indication CPU 11 intermittently operates in accordance with the timer operation to drive the lens CPU 30, which has stopped. As a result, data is inputted only through the new communication. After the data is inputted, the lens CPU 30 sleeps again. This is repeated.

Namely, after one old communication is performed, only the new communication is intermittently performed. Upon completion of the new communication, the lens CPU 30 sleeps. This contributes to a reduction in the communication time and power consumption.

As can be seen from the foregoing, according to the present invention, since the control means stops (sleeps) upon receipt of the sleep signal from the camera body, power consumption can be remarkably decreased.

Furthermore, according to the present invention, the initial lens data peculiar to the associated photographing lens and the lens data varying in accordance with the distance data, such as focal length data, are transmitted and received at different communication stages. Once the communication of the initial lens data is finished, only the variable lens data is transmitted and received in the subsequent communication. Consequently, communication time can be reduced. Furthermore, since the control means of the photographing lens sleeps between communications, power consumption can be also reduced.

We claim:

1. A camera system having a camera body, and a photographing lens which is detachably attached to said camera body, wherein;
    said camera body comprises first means for controlling an operation of said camera system;
    said photographing lens comprises second means for controlling an operation of said camera system;
    said camera system further comprising means for detecting when said photographing lens is in a suitable configuration for photographing; wherein, upon determination, by said first control means to issue a first predetermined signal to effect a sleep state in said second control means, when said means for detecting detects that said photographing lens is in a suitable configuration for photographing, said second control means carries out limited communications with said first control means, after which said photographing lens is brought into a sleep state.

2. The camera system of claim 1, wherein said second control means of said photographing lens, brought into said sleep state, operates when it receives a second predetermined signal from said first control means of said camera body.

3. The camera system of claim 1, wherein said photographing lens comprises means for outputting a clock signal so that said second control means operates synchronously with a clock signal outputted from said clock outputting means.

4. The camera system of claim 3, wherein said second control means of said photographing lens stops said clock outputting means in said sleep state of said second control means of the photographing lens.

5. The camera system of claim 1, wherein said photographing lens and said camera body comprise data communication means for transmitting and receiving data signals therebetween, so that said first predetermined signal is sent through a communication of said data communication means.

6. The camera system of claim 5, wherein said photographing lens comprises means for outputting a clock signal so that said communication is carried out synchronously with said clock signal of said clock outputting means.

7. The camera system of claim 2, wherein said camera body and said photographing lens comprise a data communication means for transmitting and receiving data signals therebetween so that said second predetermined signal is sent through a communication of said data communication means.

8. The camera system of claim 7, wherein said first control means of said camera body transmits said second predetermined signal and said first predetermined signal to said second control means of said photographing lens upon commencement and completion of said communication by said data communication means.

9. The camera system of claim 1, wherein said limited communications comprise one communication to said first control means to define initial values which are characteristic of said lens.

10. The camera system of claim 9, wherein said limited communications further comprise one communication to said first control means to define variable data which depend upon focal length and object distance.

11. The camera system of claim 10, wherein said first control means issues said first predetermined signal subsequent to said communication to define initial values and said communication to define variable data.

12. The camera system of claim 1, said first control means further comprising means for intermittently activating said second control means from said sleep state.

13. The camera system of claim 12, wherein said second control means is limited to communicating variable data during said intermittent activation.

14. The camera system of claim 9 further comprising means for storing said initial values so that said initial values need only be communicated once between said second control means and said first control means, regardless of whether said second control means is put into a sleep state.

15. The camera system of claim 1, said second control means further comprising means for eliminating said sleep state upon a change of stat of said second control means.

16. The camera system of claim 1, further comprising means for externally operating said camera system, wherein an external operation eliminates said sleep state.

17. A camera system having a camera body, and a photographing lens which is detachably attached to said camera body, wherein;
    said camera body comprises first control means for controlling an operation of said camera system;
    said photographing lens comprises means for storing initial value data that is peculiar to said photographing lens and variable lens data which varies with a photographing condition, and second control means for sending said initial value data and said variable lens data to said first control means of said camera body in accordance with a request thereof;
    said second control means of said photographing lens being brought into a sleep state when said first control means of said camera body outputs a first predetermined signal, said camera system further comprising means for detecting when said photographing lens is in a suitable configuration for photographing; wherein, upon determination, by said first control means to issue a first predetermined signal to effect a sleep state in said second control means, when said means for detecting detects that said photographing lens is in a suitable configuration for photographing, said second control means carries out limited communications with said first control means, after which said photographing lens is brought into a sleep state.

18. The camera system of claim 17, wherein said photographing lens and said camera body comprise data communication means for transmitting and receiving said initial value data and said variable lens data and said first predetermined signal therebetween.

19. The camera system of claim 18, wherein said photographing lens comprises a zoom lens.

20. The camera system of claim 19, wherein said zoom lens comprises means for detecting a focal length of said zoom lens as a photographing condition.

21. The camera system of claim 20, wherein said storing means stores variable lens data which is divided into a plurality of focal length zones and which varies in accordance with said focal length of said zoom lens.

22. The camera system of claim 21, wherein said second control means of said photographing lens reads and transmits said variable lens data, which corresponds to said focal length detected by said focal length detecting means, in accordance with said request of said first control means of said camera body from said storing means after said initial value data is transmitted to said first control means of said camera body from said storing means after said initial value data is transmitted to said first control means of said camera body, and wherein said second control means of said photographing lens is brought into said sleep state upon receipt of said first predetermined signal from said first control means of said camera body after the completion of a communication by said data communication means.

23. The camera system of claim 22, wherein said second control means of said photographing lens, brought into said sleep state, operates when it receives a second predetermined signal from said first control means of said camera body.

24. The camera system of claim 23, wherein said photographing lens comprises means for outputting a clock signal so that said second control means operates synchronously with said clock signal outputted from said clock outputting means.

25. The camera system of claim 24, wherein said second control means of said photographing lens stops said clock outputting means in said sleep state of said second control means of said photographing lens.

26. The camera system of claim 17, said first control means further comprising means for intermittently activating said second control means from said sleep state.

27. The camera system of claim 26, said means for intermittently activating said second control means further comprising means for outputting a clock signal.

28. The camera system of claim 26, wherein said second control means is limited to communicating variable data during said intermittent activation.

29. The camera system of claim 17 wherein said means for storing said initial values stores said initial values so that said initial values need only be communicated once between said second control means and said first control means, regardless of whether said second control means is put into a sleep state.

30. A camera system having a camera body, and a zoom lens which is detachably attached to said camera body, wherein;
said camera body comprises first means for controlling a photographing operation thereof;
said zoom lens comprises means for performing a zooming of said zoom lens in accordance with an external operation, means for detecting a focal length of said zoom lens, and second means for controlling said zoom performing means and focal length detecting means, and for transmitting and receiving data between said first control means of said camera body and said second control means of said zoom lens;
said second control means of said zoom lens being brought into a sleep state when said first control means of said camera body outputs a first predetermined signal upon determining that a photometering function is not being performed, and wherein said first control means allows limited communications to be transmitted between said second control means and said first control means prior to outputting said first predetermined signal but after determining that said photometering function is not being performed.

31. The camera system of claim 18, wherein said second control means of said zoom lens brought into said sleep state operates upon receipt of an external operation that is associated with the zooming operation.

32. The camera system of claim 31, wherein said second control means of said zoom lens brought into said sleep state operates upon receipt of a second predetermined signal which is outputted from said first control means of said camera body.

33. The camera system of claim 30, wherein said limited communications comprise one communication to said first control means to define initial values which are characteristic of said lens.

34. The camera system of claim 33, wherein said limited communications further comprise one communication to said first control means to define variable data which depend upon focal length and object distance.

35. The camera system of claim 30, wherein said zoom performing means comprises means for electrically driving said zoom lens.

36. A photographing lens which is detachably attached to a camera body, comprising:
means for controlling a photographing operation thereof;
said control means transferring data regarding lens characteristics prior to being brought into a sleep state when it receives a first predetermined signal which is outputted from said camera body, when said camera body determines that photographing functions are not being performed and said lens is in a configuration which is suitable for photographing;
said camera body further comprising means for detecting when said photographing lens is in a suitable configuration for photographing; wherein, upon determination, by said camera body to issue a first predetermined signal to effect a sleep state in said lens control means, when said means for detecting detects that said photographing lens is in a suitable configuration for photographing, said lens control means carries out limited communications with said camera body, after which said photographing lens is brought into a sleep state.

37. The photographing lens of claim 21, wherein said controlling means brought into said sleep state operates upon receipt of a second predetermined signal which is outputted from said camera body.

38. The photographing lens of claim 37, further comprising means for outputting a clock signal so that said controlling means operates synchronously with said clock signal outputted from said clock outputting means.

39. The photographing lens of claim 38, wherein said controlling means stops said clock outputting means in said sleep state.

40. The photographing lens of claim 38, further comprising a data communication means for transmitting and receiving signals between said photographing lens and said camera body to which said photographing lens is attached so that said first predetermined signal is sent through a communication of said data communication means.

41. The photographing lens of claim 40, wherein said communication means operates synchronously with said clock signal outputted by said clock outputting means.

42. The photographing lens of claim 41, wherein said controlling means brought into said sleep state operates upon receipt of a second predetermined signal which is outputted from said camera body.

43. The camera system of claim 36, further comprising means for activating said control means upon commencement of an external operation of said camera.

* * * * *

UNITED STATES PATENT AND TRADEMARK OFFICE
CERTIFICATE OF CORRECTION

PATENT NO. : 5,255,046
DATED : October 19, 1993
INVENTOR(S) : M. Kawasaki, et. al.

It is certified that error appears in the above-indentified patent and that said Letters Patent is hereby corrected as shown below:

On the Title page, item [56] under U.S. Patent Documents, change "4,602,871" to --4,602,861--.

Signed and Sealed this

Ninth Day of August, 1994

Attest:

BRUCE LEHMAN

Attesting Officer

Commissioner of Patents and Trademarks